(12) United States Patent
Wang et al.

(10) Patent No.: US 10,659,663 B2
(45) Date of Patent: May 19, 2020

(54) DOUBLE-CAMERA DRIVE DEVICE

(71) Applicant: Shanghai Billu Electronics Co., Ltd., Shanghai (CN)

(72) Inventors: Jianhua Wang, Shanghai (CN); Gaofeng Gong, Shanghai (CN)

(73) Assignee: Shanghai Billu Electronics Co., Ltd., Shanghai (CN)

( * ) Notice: Subject to any disclaimer, the term of this patent is extended or adjusted under 35 U.S.C. 154(b) by 0 days.

(21) Appl. No.: 16/096,299

(22) PCT Filed: Sep. 12, 2017

(86) PCT No.: PCT/CN2017/101354
§ 371 (c)(1),
(2) Date: Oct. 25, 2018

(87) PCT Pub. No.: WO2018/086408
PCT Pub. Date: May 17, 2018

(65) Prior Publication Data
US 2019/0268511 A1    Aug. 29, 2019

(30) Foreign Application Priority Data
Nov. 11, 2016   (CN) .......................... 2016 1 0993269

(51) Int. Cl.
*H04N 5/225*  (2006.01)
*H04N 5/232*  (2006.01)

(52) U.S. Cl.
CPC ......... *H04N 5/2252* (2013.01); *H04N 5/2253* (2013.01); *H04N 5/2258* (2013.01); *H04N 5/232* (2013.01)

(58) Field of Classification Search
CPC .. H04N 5/2252; H04N 5/2253; H04N 5/2258; H04N 5/232
(Continued)

(56) References Cited

U.S. PATENT DOCUMENTS

2013/0141541 A1* 6/2013 Jung ...................... H04N 5/225
                                                             348/46
2015/0316744 A1* 11/2015 Chen ...................... H04N 5/247
                                                             359/824
(Continued)

FOREIGN PATENT DOCUMENTS

CN       105739053 A    7/2016
CN       105785547 A    7/2016
(Continued)

*Primary Examiner* — Lin Ye
*Assistant Examiner* — Chan T Nguyen
(74) *Attorney, Agent, or Firm* — Gang Yu

(57) ABSTRACT

A double-camera drive device, including: cover bodies, including a first cover body and a second cover body, and each of the cover bodies being provided with a lens accommodating cavity; photographing components, including a first photographing component and a second photographing component, and each of the photographing components including an upper spring, an upper cover, a lens support winded with a drive coil at a outer periphery, driving magnets and a lower spring, wherein the driving magnets includes a left driving magnet, a right driving magnet and a middle driving magnet; and Hall detection components, each of the Hall detection components including a Hall gasket and a Hall magnet provided on each of lens supports, and a Printed Circuit Board (PCB) component. According to the double-camera drive device, beneficial effects of clearer opposite angles and wider framing range and better quality of photographed images are implemented.

10 Claims, 5 Drawing Sheets

(58) Field of Classification Search
USPC .................................................. 348/373–375
See application file for complete search history.

(56) References Cited

U.S. PATENT DOCUMENTS

| | | | |
|---|---|---|---|
| 2017/0082823 A1* | 3/2017 | Hwang | H04N 5/2328 |
| 2018/0031860 A1* | 2/2018 | Bachar | G02B 13/003 |
| 2018/0100984 A1* | 4/2018 | Wu | G02B 7/08 |

FOREIGN PATENT DOCUMENTS

| | | |
|---|---|---|
| CN | 205485002 U | 8/2016 |
| CN | 106505823 A | 3/2017 |
| CN | 206133096 U | 4/2017 |
| CN | 206135688 U | 4/2017 |
| CN | 106657730 A | 5/2017 |
| CN | 206195583 U | 5/2017 |
| CN | 206341293 U | 7/2017 |
| WO | 2015124966 A1 | 8/2015 |

* cited by examiner

DOUBLE-CAMERA DRIVE DEVICE

TECHNICAL FIELD

The present disclosure relates to a drive device, and more particularly, to a double-camera drive device.

BACKGROUND

A photographing drive device is an important component for supporting photography in devices such as a mobile terminal. From the development of mobile devices in the past few years, the mobile devices such as a high-priced mobile phone on a market emphasize on improvement of hardware specification of a single camera in competition of photographing components. From an increase in a pixel at the earliest to an increase and discovery in a motion dimensionality of a photographing device in recent two years, the increase in the pixel at present has encountered a bottleneck, and at least, differences in the pixel are not perceived via the mobile phone. In an exemplary embodiment, along with the ever-growing photographing demand of consumers on an intelligent mobile phone, there emerge many defects difficult to be overcome by a traditional single-camera mobile phone, including a limited photo range photographed by a single camera. Due to limitations in thickness of the mobile phone, the quality of a lens and the size of a sensor are highly demanding. A space for improving quality and definition at present has become fairly limitable. With respect to photographing effect, only a 2D photographed picture can be implemented at last, and is quite different from a scene picture seen by an actual human eye.

In light of market requirements on light weight and small thickness of the mobile phone at present, it is very difficult to greatly improve various imaging qualities via a single-camera photographing device in a limited space allowed by the lens to drive.

SUMMARY

In light of the background, the present disclosure is provided a double-camera drive device, and aims to implement beneficial effects of clearer opposite angles, wider framing, range and better quality of photographed images through a triangulation algorithm for simulating two eyes of a person on the premise of not increasing the thickness of a mobile phone.

To this end, the technical solutions of some embodiments of the present disclosure are as follows.

A double-camera drive device includes:

cover bodies, including a first cover body and a second cover body, and each of the cover bodies being provided with a lens accommodating cavity;

photographing components, including a first photographing component and a second photographing component respectively and correspondingly provided on the first cover body and the second cover body and each of the photographing components including an upper spring, an upper cover, a lens support winded with a drive coil at a outer periphery, driving magnets and a lower spring, wherein the driving magnets include a left driving magnet provided on the left side of the first cover body, a right driving magnet provided on the right side of the second cover body and a middle driving magnet provided between the first cover body and the second cover body; and Hall detection components, including a first Hall detection component provided on the first cover body and the first photographing component and a second Hall detection component provided on the second cover body and the second photographing component, each of the Hall detection components including a Hall gasket and a Hall magnet provided on each of lens supports, and a Printed Circuit Board (PCB) component, and each of PCB components including a PCB board provided at one side of each of the cover bodies, as well as a Hall chip, a capacitor, pins and an internal circuit provided on the PCB board.

In an exemplary embodiment, the double-camera drive device includes:

cover bodies, including a first cover body and a second cover body, the first cover body and the second cover body being completely the same in shape and size, a translation generating structure being provided between the first cover body and the second cover body, and lens accommodating, cavities respectively corresponding to the first cover body and the second cover body being equal in size and being arranged in parallel;

photographing components, including a first photographing component and a second photographing component respectively and correspondingly provided on the first cover body and the second cover body and each of the photographing components including an upper spring, an upper cover, a lens support winded with a drive coil at a outer periphery, driving magnets and a lower spring component, wherein the driving magnets include a left driving magnet provided on the left side of the first cover body, a right driving magnet provided on the right side of the second cover body and a middle driving magnet provided between the first cover body and the second cover body; the left driving magnet and the right driving magnet are equal to the middle driving magnet in size and shape and are arranged in axial symmetry around a central axis of the middle driving magnet; and the upper springs, the upper covers, the lens supports winded with the drive coils at a outer periphery and the lower spring components included in the two photographing components are consistent in structure and size and are arranged in parallel; and Hall detection components, including a first Hall detection component provided on the first cover body and the first photographing component and a second Hall detection component provided on the second cover body and the second photographing component, each of the Hall detection components including a Hall gasket and a Hall magnet provided on each of lens supports, and a PCB component, and each of PCB components including a PCB board provided at one side of each of the cover bodies, as well as a Hall chip, a capacitor, pins and an internal circuit provided on the PCB board, wherein components included in the first Hall detection component and the second Hall detection component are consistent in structure and size, and are arranged in parallel.

In an exemplary embodiment, the double-camera drive device In an exemplary embodiment includes pedestals which take supporting effect (mainly taking the supporting effect for the photographing components comprising the lens supports); the pedestals includes a first pedestal and a second pedestal respectively provided corresponding to the first photographing component and the second photographing component; preferably, the first pedestal and the second pedestal are of an integrally molded pedestal structure; two inner cavities that are equal in size are arranged in the integrally molded pedestal structure; the two inner cavities are arranged in parallel; and dustproof rings having a certain height and protruded are arranged along the circumferential sides of the inner cavities and are matched with lower end portions of the lens supports for dustproof effect.

In an exemplary embodiment, the over bodies are made of a copper alloy material and are integrally molded via a metal die casting process; two lens accommodating cavities having same size and shape are respectively provided on top surfaces of the cover bodies; and multiple turnup edges are provided at a periphery in each of the lens accommodating cavities and are matched with gap portions on each of lens supports.

In an exemplary embodiment, the upper covers are of a frame structure; a rear side of the upper covers are respectively provided with a hollow port configured to embed the Hall chips protruded on the PCB boards; In an exemplary embodiment, two upper covers respectively positioned in the first photographing component and the second photographing component are of an integrally molded upper cover structure; and buckling-clamping grooves is respectively formed on left and right sides and on a middle portion of the integrally molded upper cover structure, and is configured to buckle and clamp the driving magnets thereon.

In an exemplary embodiment, multiple outer circumferential side penetration holes and multiple inner circumferential side penetration holes are formed at four corners of each of the lower springs; the outer circumferential side penetration holes sleeves lug bosses on the pedestals; the inner circumferential side penetration holes are configured to connect and fix with the lower end surfaces of the lens supports; two ends at same sides of each of the lower springs are provided with two terminal pins; and after assembly, the two terminal pins contact two pins on the PCB boards to form electrical connections.

In an exemplary embodiment, the Hall chips and the Hall magnets provided on the lens supports are spatially in a relationship of being opposite to each other in positions.

In an exemplary embodiment, the two Hall magnets respectively included in the first Hall detection component and the second Hall detection component must be required to keep highly consistent in loading positions; that is, the two Hall magnets on the two lens supports must be completely consistent in the loading positions, and are arranged in a translation relationship.

In an exemplary embodiment, each distance between the left driving magnet, the middle driving magnet and the right driving magnet and the drive coils keeps consistent, so that the optimal effect of the double-camera drive device of the present disclosure can be achieved.

According to the double-camera drive device improved by the inventor of the present disclosure, through simulating framing and focusing functions similar to human eyes, the effect that a photographed real scene, and a scene seen by the eyes are tend to be consistent is implemented. By employing a double-camera triangulation simulation algorithm, more accurate photo framing is implemented, thereby obtaining better photographing quality. In an exemplary embodiment, the 3D effect similar to the human eyes is implemented, and the better photographing experience is obtained. It is to be noted that, the double-camera drive device of the present disclosure may be applied to mobile terminal devices such as an intelligent mobile phone and a tablet computer, thus providing a physical support to better implement a photographing function.

Figure 1:
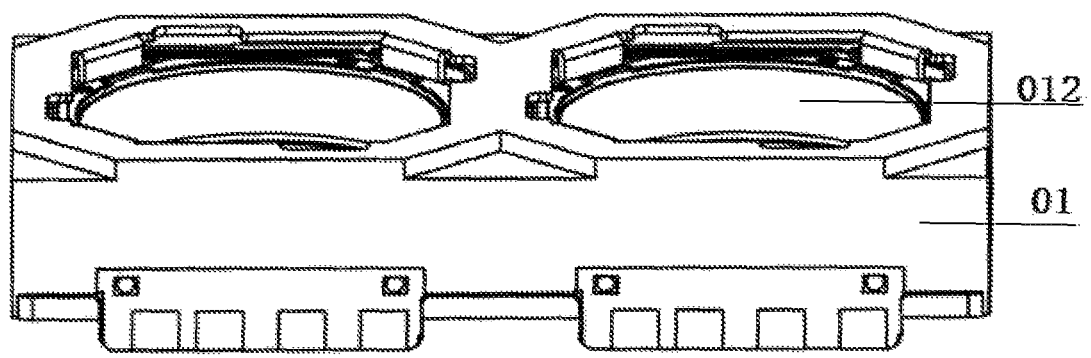
FIG. 1 is a schematic diagram of a front stereoscopic structure of a double-camera, drive device in an embodiment of the present disclosure.

Labels in the drawings:
01—a cover body
011—a turnup edge;
012—a lens accommodating, cavity;
02—a photographing component
021—a first photographing group
022—a second photographing group
03—an upper spring
04—a lower spring
041—a terminal end
042—an outer circumferential side penetration hole
043—an inner circumferential side penetration hole
05—an upper cover
051—a hollow port
052—a buckling-clamping groove
06—a lens support
061—gap portions
07—a drive coil
08—a driving magnet
081—a left driving magnet
082—a right driving magnet
083—a middle driving magnet
09—a Hall detection component
091—a Hall magnet
092—a Hall gasket
093—a PCB component
0931—a capacitor
0932—a PCB board 0933—a PCB pin
0934—a Hall chip
10—a pedestal
101—a lug boss
102—a dustproof ring
103—an inner cavity

DETAILED DESCRIPTION OF THE EMBODIMENTS

The technical solutions of the present disclosure will be clearly and completely described as follows with reference to the accompanying drawings. Apparently, the embodiments as described below are merely part of, rather than all, embodiments of the present disclosure. Based on the embodiments of the present disclosure, any other embodiment obtained by a person skilled in the art without paying any creative effort shall fall within the protection scope of the present disclosure.

In the description of the present disclosure, it is to be noted that, the orientation or positional relationship indicated by terms "center", "upper", "lower", "left", "right", "vertical", "horizontal", "Inner" and the like is based on the orientation or positional relationship shown in accompanying drawings, which is intended to facilitate the description of the present disclosure rather than to mean that the device or component in question must have a particular orientation and is constructed and operated at a particular orientation and therefore it cannot be construed as limiting the scope of the present disclosure. In addition, terms "first" and "second" are only for description and cannot be understood as indicating or implying relative importance.

The present disclosure provides a double-camera drive device, which includes:

cover bodies 01, including a first cover body and a second cover body, and each of the cover bodies being provided with a lens accommodating cavity 012;

photographing components 02, including a first photographing component 021 and a second photographing component 022 respectively and correspondingly provided on the first cover body and the second cover body and each of the photographing components including an upper spring 03, an upper cover 05, a lens support 06 winded with a drive coil 07 at a outer periphery, driving magnets 08 and a lower spring 04, wherein the driving magnets 08 include a left driving magnet 081 provided on the left side of the first cover body, a right driving magnet 082 provided on the right side of the second cover body and a middle driving magnet 083 provided between the first cover body and the second cover body; and Hall detection components 09, including, a first Hall detection component provided on the first cover body and the first photographing component and a second Hall detection component provided on the second cover body and the second photographing component, each of the Hall detection components including a Hall gasket 092 and a Hall magnet 091 provided on each of lens supports 06, and a PCB component 093, and each of PCB components 093 including a PCB board 0932 provided at one side of each of the cover bodies, as well as a Hall chip 0934, a capacitor 0931, pins and an internal circuit 0933 provided on the PCB board 0932.

Figure 2:
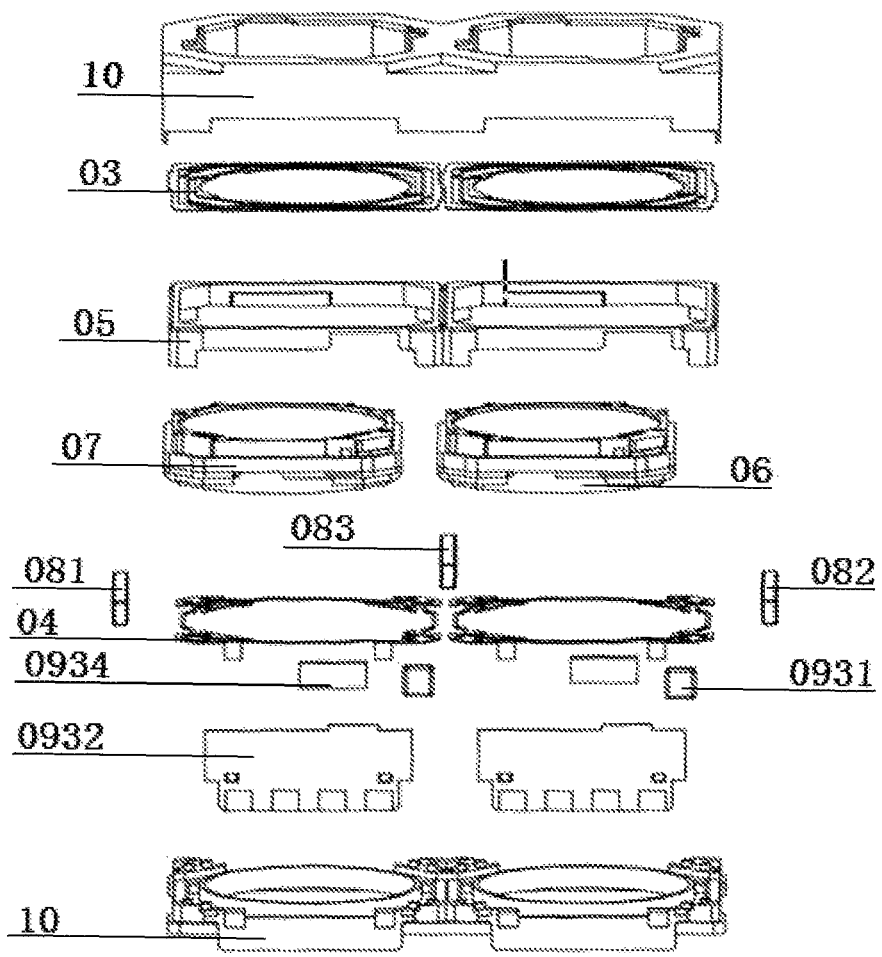
FIG. 2 is a structural decomposition diagram of a double-camera drive device in an embodiment of the present disclosure.

In one embodiment, as shown in FIG. 2, a double-camera drive device includes:

cover bodies 01, including a first cover body and a second cover body, the first cover body and the second cover body being completely the same in shape and size, a translation generating structure being provided between the first cover body and the second cover body, and lens accommodating cavities respectively corresponding to the first cover body and the second cover body being equal in size and being arranged in parallel;

photographing components 02, including a first photographing component 021 and a second photographing component 022 respectively and correspondingly provided on the first cover body and the second cover body and each of the photographing components 02 including an upper spring 03, an upper cover 05, a lens support 06 winded with a drive coil 07 at a outer periphery, driving magnets 08 and a lower spring 04, wherein the driving magnets 08 include a left driving magnet 081 provided on the left side of the first cover body, a right driving magnet 082 provided on the right side of the second cover body and a middle driving magnet 083 provided between the first cover body and the second cover body; the left driving magnet 081 and the right driving magnet 082 are equal to the middle driving magnet 083 in size and shape and are arranged in axial symmetry around a central axis of the middle driving magnet 083; and the upper springs 03, the upper covers 05, the lens supports 06 provided with the drive coils 07 at a outer periphery and the lower springs 04 included in the two photographing components 02 are consistent in structure and size and are arranged in parallel; and Hall detection components 09, including a first Hall detection component provided on the first cover body and the first photographing component 021 and a second Hall detection component provided on the second cover body and the second photographing component 022, each of the Hall detection components including a Hall gasket 092 and a Hall magnet 091 provided on each of lens supports 06, and a PCB component 093, and each of PCB components 093 including a PCB board 0932 provided at one side of each of the cover bodies, as well as a Hall chip 0934, a capacitor 0931, pins 0933 and an internal circuit provided on the PCB board 0932, wherein components included in the first Hall detection component and the second Hall detection component are consistent in structure and size, and are arranged in parallel.

In one embodiment, as shown in FIG. 2, an integral double-camera drive device includes:

a cover body, the cover body being provided with two lens accommodating cavities 012 which are symmetrical bilaterally and are equal in size;

photographing components 02, including a first photographing component 021 and a second photographing component 022, wherein the first photographing component 021 and the second photographing component 022 are the same in internal composition structure, are consistent in size and are used as a central optical axis to each other to be parallel and symmetrical: the first photographing component 021 and the second photographing component 022 are combined to form a double-camera group mode; and each of the photographing components is composed of an upper spring 03, an upper cover 05, a lens support 06 winded with a drive coil at a outer periphery, driving magnets 08 and a lower spring 04; and a Hall detection component 09, including a Hall magnet 091, a Hall gasket 091, and a PCB component 093 having a Hall chip 0934.

Figure 10:
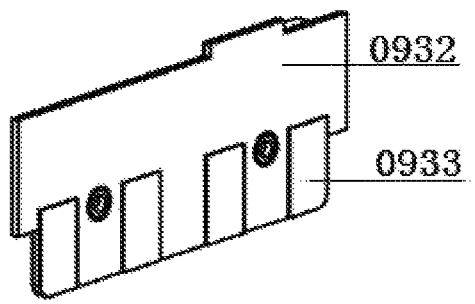
FIG. 10 is a structural schematic diagram of a cover body facing side of a PCB component in an embodiment of the present disclosure.
Figure 11:
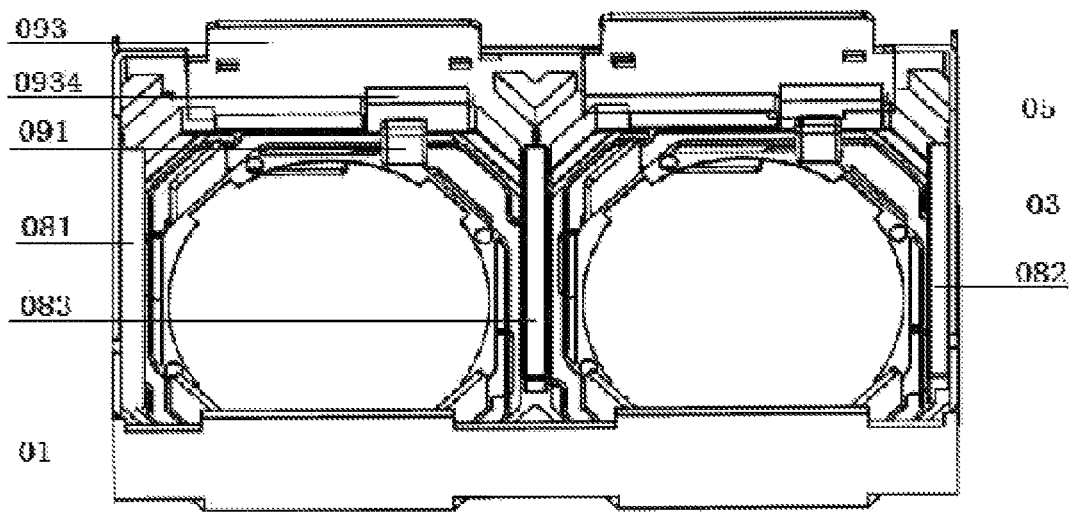
FIG. 11 is a schematic diagram of a positional relationship among a cover body, an upper cover, a driving magnet, a PCB component, a Hall magnet and an upper spring in an embodiment of the present disclosure.
Figure 12:
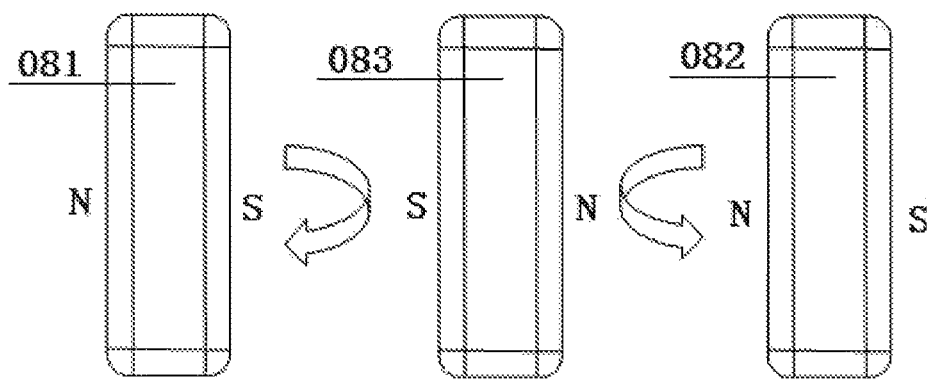
FIG. 12 is a schematic diagram of a positional relationship and a current direction of a magnetic pole of a driving magnet under an assembly status in an embodiment of the present disclosure.

In a structure of the double-camera drive device of the present disclosure, three lens driving magnets having equal size and shape are shared. As shown in FIG. 10, a left driving magnet 081 and a right driving magnet 082 are respectively provided at the left side of the first photographing component 021 and at the right side of the second photographing component 022; the other sides of the two magnets are respectively attached to two inner sides of the cover body 01; and a middle position portion of the upper cover 05 is provided with a middle driving magnet 083 shared by the first photographing component 021 and the second photographing component 022. Specifically, as shown in FIG. 11, it shows a positional relationship and a current direction of a magnetic pole of a driving magnet 08 under an assembly status.

In one specific embodiment, the lens driving magnets 08 are of an elongated shape. The three driving magnets are equidistantly arranged from left to right, and sequentially are the left driving magnet 081, the middle driving magnet 083 and the right driving magnet 082, wherein the left side of the left driving magnet 081 is the N pole, the left side of the middle driving magnet 083 is the S pole and the left side of the right driving magnet 082 is the N pole; or the left side of the left driving magnet 081 is the S pole, the left side of the middle driving magnet 083 is the N pole and the left side of the right driving magnet 082 is the S pole.

Generally, if left and right sides of the first photographing component 021 and the second photographing component 022 are respectively provided with one driving magnet 08, magnetic interference will be caused between the two driving magnets 08 of the first photographing component 021 and the second photographing component 022 to affect the assembly and imaging effect. With the adoption of the shared middle driving magnet 083 of the present disclosure, not only is the mutual magnetic interference between the two driving magnets avoided, but the problems such as requirement on an external dimension of a camera device and interference of a magnetic field and the like on an antenna are also greatly reduced. With such a structure, the whole camera is endowed with a looser dimension design space. Since points on the components are reduced, the cost is saved to some extent, and the assembly is also easier.

Since a double-camera drive mode in which the first photographing component 021 and the second photographing component 022 are the same in specification and design is adopted, the double photographing characteristic in which same pixels are parallel is achieved. In order to guarantee that the two groups of cameras have complete stability and synchronism in electromagnetic driving aspect, the distances between the three driving magnets and the drive coil must keep consistent, thereby achieving the optimal effect of the double-camera drive device of the present disclosure.

Next, specific implementation forms of the present disclosure will be In an exemplary embodiment described below in detail with reference to implementation legends. It is to be noted that, the components in the first photographing component and the second photographing component in the embodiments are the same in structure, shape and size, so when a constituent part of each of the photographing components is mentioned, it indicates a general uniform description on performance, appearance and the like of the same part, and such description will not be repeated hereinafter.

Figure 3:
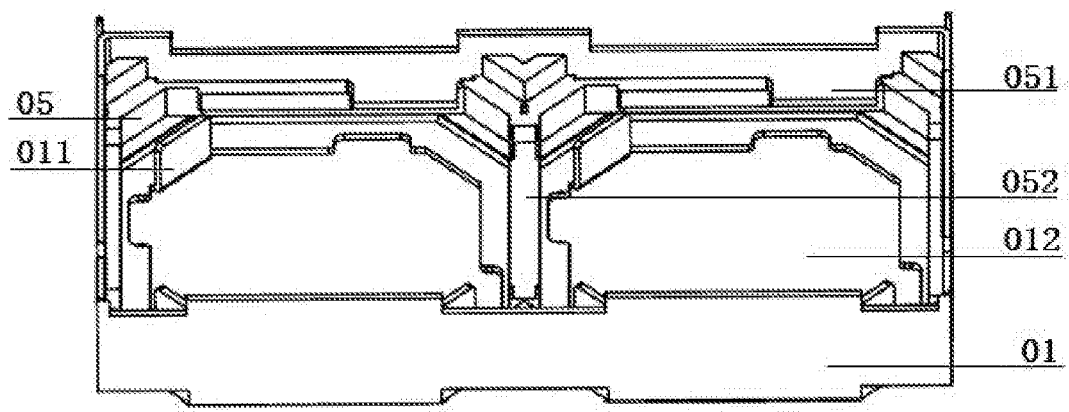
FIG. 3 is an assembly diagram of a positional relationship between a cover body and an upper cover in an embodiment of the present disclosure.

In one embodiment, the cover bodies 01 are made of a copper alloy material and are molded via an integral metal die casting process. As shown in FIG. 3, the cover bodies 01 on a plane are of a square frame structure; two lens accommodating cavities 012 having same size and shape are respectively provided on top surfaces of the cover bodies 01; multiple turnup edges 011 are provided at a periphery in each of the lens accommodating cavities and are matched with gap portions 061 on each of lens supports 06. In addition to accommodating and protecting the photographing components 02 inside, the cover bodies 01 have the shielding effect of preventing external signal interference, so the call quality is enhanced.

The upper covers 03 are of a platy leaf spring structure and are positioned between the cover bodies 01 and the upper covers 05. The outer rings of the upper springs 03 are provided on the upper covers 05, and the inner rings of the upper springs 03 are fixed with top end surfaces of the lens supports 06 by nesting and splicing.

Figure 4:
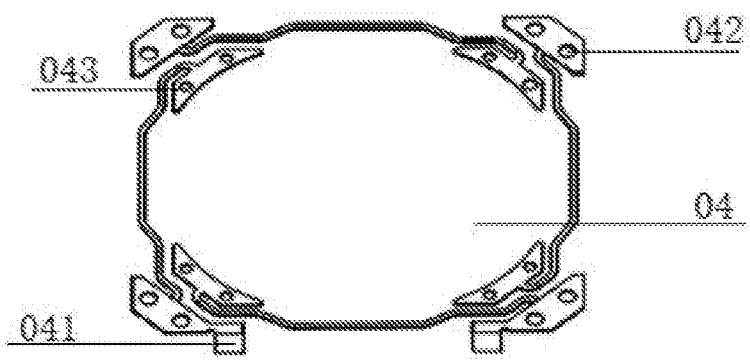
FIG. 4 is a structural planar schematic diagram of a lower spring in an embodiment of the present disclosure.
Figure 5:
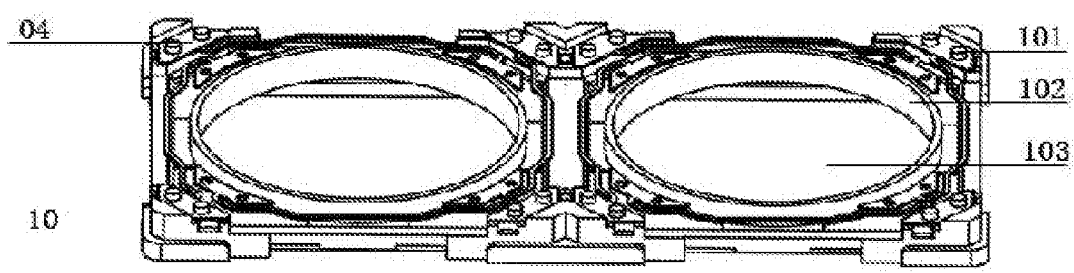
FIG. 5 is an assembly diagram of a positional relationship between a lower spring and a pedestal in an embodiment of the present disclosure.

In one embodiment, as shown in FIG. 4, the lower springs 04 are of a planar leaf spring structure. Multiple outer circumferential side penetration holes 042 and multiple inner circumferential side penetration holes 043 are formed at four corners of each of the lower springs 04. As shown in FIG. 5, the outer circumferential side penetration holes 042 sleeves lug bosses 101 on the pedestals 10 and are fixed on the pedestals 10. Inner circumferential portions of the springs are provided on lower end surfaces of the lens supports; and by pointing an adhesive on the multiple inner circumferential side penetration holes 043, inner circumferential springs are firmly connected and fixed on a lower end surface of a carrier. Two ends at same sides of each of the lower springs are provided with two terminal pins 041; and after assembly, the two terminal pins 041 contact two pins 0933 on the PCB boards 0932 to form electrical connections.

Figure 6:
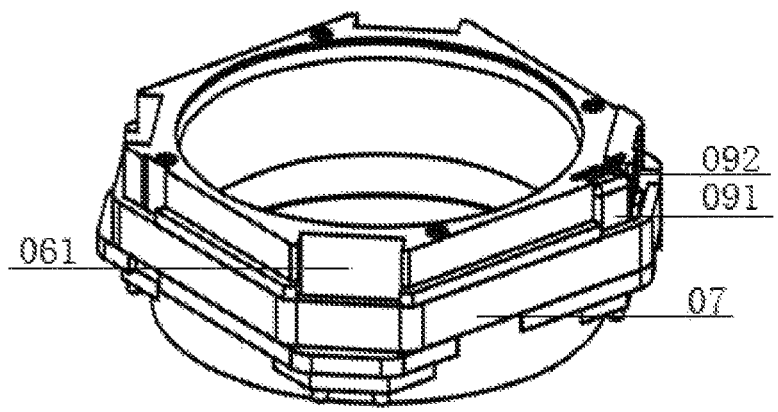
FIG. 6 is an assembly diagram of a positional relationship between a Hall gasket and a Hall magnet on a lens support in an embodiment of the present disclosure.

In one embodiment, as shown in FIG. 6, the lens supports 06 are of a tubular shape on an optical axis diameter direction, and the upper end surfaces and the lower end surfaces of the lens supports 06 are respectively supported and clamped by the upper springs 03 and the lower springs 04. The inner circumferences of the lens supports 06 are provided with lenses, and the outer circumferences of the lens supports 06 are provided with the drive coils 07, in which the outer circumferences of the lens supports 06 are consistent to the inner circumferences of the drive coils 07. The lens supports 06 are respectively provided with gap portions 061 at upper four corners of the outer circumferences. The gap portions 061 are matched with the turnup edges 011 inside the cover bodies 01 in a non-contact manner. When the lens supports 06 are driven, good anti-deflection torsion resistant performance is achieved on X and Y axles of a circumferential direction or on a Z axis of an optical axis. An opened notch portion is additionally formed on the upper corners of the lens supports 06 respectively. The opened notch portions are accommodated into the Hall gaskets 092 and the Hall magnets 091 sequentially and vertically from inside to outside. Back gaskets arranged inside the Hall magnets 091 are made of a stainless steel high-magnetism material and have flux leakage prevention effect, so the flux intensity of the Hall magnets 091 is effectively protected and improved, and the Hall magnets 091 can be assembled more easily and flatly. Herein, it is to be particularly noted that, due to limitations in objective conditions about photographing principle and function of the double camera, loading positions of the Hall magnets 091 inside the two groups of the cameras must be required to keep highly consistent. Or otherwise, when the two cameras frames, good imaging quality to be achieved by the double camera expectedly is affected due to theoretical desynchrony and discordance of focusing positions fed back by the position deviations.

In one embodiment, the upper covers 05 are of a frame structure and are molded via an integral process. As shown in FIG. 3, the upper covers 05 are arranged inside the cover bodies, and are provided with buckling-clamping grooves 052 on inside central portions respectively. The driving magnet shared by the two photographing components 02 at the middle position can be buckled and clamped on the buckling-clamping groove 052. A position, close to a foot portion, at the rear right side of each of the upper covers 05 is provided with a hollow port 051. The Hall chips 0934 provided on the PCB boards 0932 in a protruded manner are embedded into the hollow ports 051 of the upper covers 05. After assembly, the Hall chips 0934 are spatially opposite to the Hall magnets 091 provided on the lens supports 06. Similarly, the loading positions of the two Hall chips 0934 must keep highly consistent.

Figure 7:
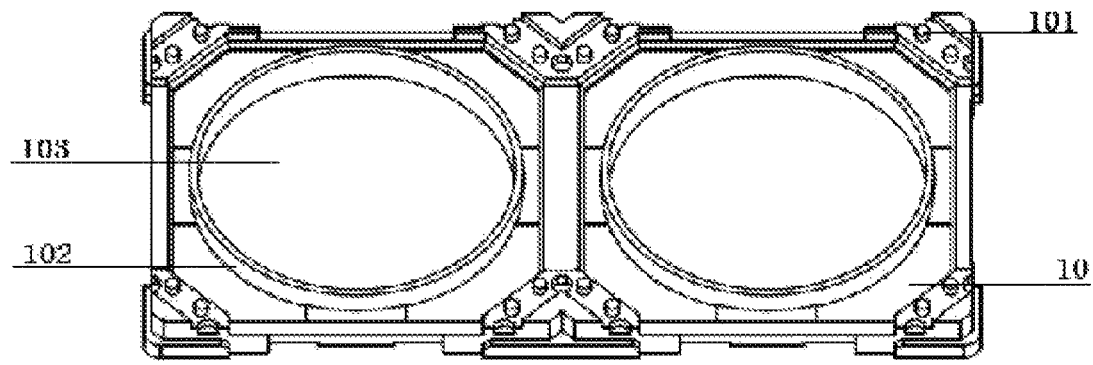
FIG. 7 is a stereoscopic structural schematic diagram of a pedestal in an embodiment of the present disclosure.
Figure 8:
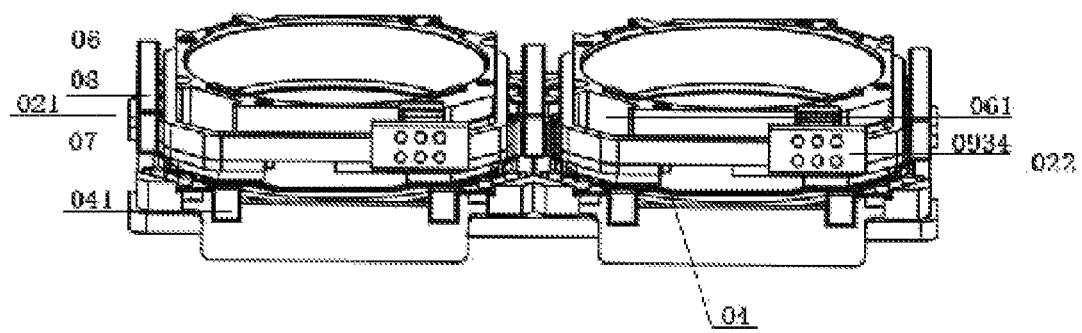
FIG. 8 is a schematic diagram of a positional relationship among a lens support, a driving magnet, a lower spring, a Hall chip, a Hall magnet and a pedestal in an embodiment of the present disclosure.

In one embodiment, the pedestals 10 are of a structure molded via an integral process. As shown in FIG. 7, the pedestals 10 are provided with two inner cavities 103 that are equal in size; dustproof rings 102 having a certain height and protruded are arranged along the circumferential sides of the inner cavities 103 and are matched with lower end portions of the lens supports 06 for dustproof effect. As shown in FIG. 8, the pedestals 10 support the first photographing component 021 on the left and the second photographing component 022 on the right. As shown in FIG. 1, the pedestals 10 are embedded into the cover bodies 01.

Figure 9:
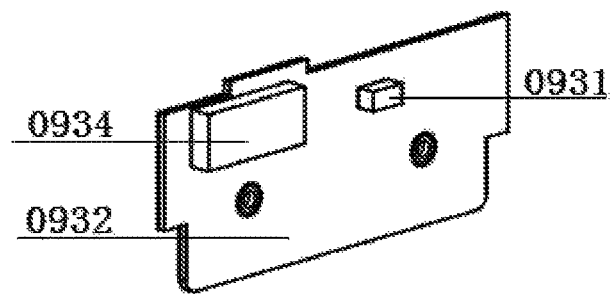
FIG. 9 is a structural schematic diagram of a Hall magnet facing side of a PCB component in an embodiment of the present disclosure.

In one embodiment, as shown in FIG. 9-10, each of the PCB component 093 is composed of a PCB board 0932, a Hall chip 0934, a capacitor 0931, four pins 0933 and an internal connection circuit.

The electrical connection is as follows: start and end lines of the drive coils 07 winded at a outer periphery of the lens supports 06 are respectively welded to two different portions on surfaces of the lower springs 04. Two terminal pins 041 of the lower springs 04 are respectively and electrically connected with the two pins 0933 of the PCB boards 0932.

Through the Hall effect of the Hall chips 0934 in the PCB boards 0932 and interaction of the Hall magnets 091, there forms a control means for detecting a feedback of a lens position, and thus the closed-loop camera drive is formed. Therefore, the lenses in the lens supports 06 are shifted more accurately at each time, the times that the lenses are moved back and forth is reduced, and the effect of focusing quickly and accurately is achieved.

In an exemplary embodiment, in a specific application embodiment, according to functions and requirements attained by photography, it is unnecessary to keep the lenses of the two photographing components 02 consistent. Additionally, in the integral double-camera drive device of the present disclosure, other parts of the first photographing component 021 and the second photographing component 022 In an exemplary embodiment can be changed and adjusted correspondingly in size, specification, form and distance between the cameras. The so-called integral camera structure in the present disclosure is based on one cover body 01, and if necessary, may be changed into a split double-camera structure with two cover bodies. According to a functional design, the two cameras may be controlled individually or simultaneously via an IC, drive. As a matter of fact, the structures on left and right sides may be integrated or connected correspondingly as needed.

In one specific embodiment, after performing camera drive debugging and effect debugging of the back end as well as algorithm debugging and implanting of the double camera with a software algorithm, the double-camera drive device finally can implement many effects that a single camera cannot achieve according to the needed functional requirements. For example:

(1) Naked eye 3D: by directly photographing a 3D photo or video with two lenses having the same pixel, the effect may be watched on a screen supporting naked eye 3D display.

(2) Depth-of-field assistance: a main lens and an auxiliary lens are provided. The main lens is configured to image. The auxiliary lens has a relatively low pixel, is configured to record depth-of-field information and does not directly affect the photographing quality. When a specimen page is photographed, the two lenses are synergistic; and through a manner of photo synthesis, more free background blurring effect can be implemented.

(3) Black and white+color: a main lens is provided with a color sensor. The auxiliary lens is provided with a black-white sensor having the same pixel. During photographing, the two lenses can be synergistic to synthesize a photo. The color lens collects an image color. The black-white lens supplements image brightness and details. And the cameras are matched to each other to image and synthesize into a high-resolution image.

The above describes the specific embodiments of the present disclosure in detail, are only exemplary embodiments and do not limit the specific embodiments described above. For a person skilled in the art, any equivalent modification and replacement made to the present disclosure are fallen into a scope of the present disclosure. Therefore, the equivalent alternation and modification made without departing from the spirits and scope of the present disclosure should be included in the scope of the present disclosure.

What is claimed is:

1. A double-camera drive device, wherein the double-camera drive device comprises:
   cover bodies, comprising a first cover body and a second cover body, and each of the cover bodies being provided with a lens accommodating cavity;
   photographing components, comprising a first photographing component and a second photographing component respectively and correspondingly provided on the first cover body and the second cover body and each of the photographing components comprising an upper spring, an upper cover, a lens support winded with a drive coil at a outer periphery, driving magnets and a lower spring, wherein the driving magnets comprise a left driving magnet provided on a left side of the first cover body, a right driving magnet provided on a right side of the second cover body and a middle driving magnet provided between the first cover body and the second cover body; and
   Hall detection components, comprising a first Hall detection component provided on the first cover body and the first photographing component and a second Hall detection component provided on the second cover body and the second photographing component, each of the Hall detection components comprising a Hall gasket and a Hall magnet provided on each of lens supports, and a Printed Circuit Board (PCB) component, and each of PCB components comprising a PCB board provided at one side of each of the cover bodies, as well as a Hall chip, a capacitor, pins and an internal circuit provided on the PCB board.

2. The double-camera drive device as claimed in claim 1, the first cover body and the second cover body being completely the same in shape and size, the first cover body and the second cover body are arranged in parallel, and accommodating cavities respectively corresponding to the first cover body and the second cover body being equal in size and being arranged in parallel;

the left driving magnet and the right driving magnet are equal to the middle driving magnet in size and shape and are arranged in axial symmetry around a central axis of the middle driving magnet; and tupper springs, upper covers, lens supports winded with drive coils at the outer periphery and lower spring components comprised in two photographing components are consistent in structure and size and are arranged in parallel; and the Hall detection components, comprising the first Hall detection component provided on the first cover body and the first photographing component and the second Hall detection component provided on the second cover body and the second photographing component, each of the Hall detection components comprising a Hall gasket and a Hall magnet provided on each of lens supports, and the PCB component, and each of PCB components comprising a PCB board provided at one side of each of the cover bodies, as well as the Hall chip, the capacitor, pins and the internal circuit provided on the PCB board, wherein components comprised in the first Hall detection component and the second Hall detection component are consistent in structure and size, and are arranged in parallel.

3. The double-camera drive device as claimed in claim 1, wherein the double-camera drive device In an exemplary embodiment comprises further take supporting effect, wherein the pedestals comprises a first pedestal and a second pedestal respectively provided corresponding to the first photographing component and the second photographing component; the first pedestal and the second pedestal are of an integrally molded pedestal structure; two inner cavities that are equal in size are arranged in the integrally molded pedestal structure; the two inner cavities are arranged in parallel; and dustproof rings having a certain height and protruded are respectively arranged along the circumferential sides of the inner cavities and are matched with lower end portions of the lens supports for dustproof effect.

4. The double-camera drive device as claimed in claim 1, wherein the over bodies are made of a copper alloy material and are integrally molded via a metal die casting process; two lens accommodating cavities having same size and shape are respectively provided on top surfaces of the cover bodies; and multiple turnup edges are provided at a periphery in each of the lens accommodating cavities and are matched with multiple gap portions on each of lens supports.

5. The double-camera drive device as claimed in claim 1, wherein each of the upper covers is of a frame structure; a rear side of each of the upper covers is respectively provided with a hollow port configured to embed the Hall chip protruded on the PCB board; two upper covers respectively positioned in the first photographing component and the second photographing component are of an integrally molded upper cover structure; and buckling-clamping grooves are respectively formed on left and right sides and on a middle portion of the integrally molded upper cover structure, and is configured to buckle and clamp the driving magnets thereon.

6. The double-camera drive device as claimed in claim 1, wherein multiple outer circumferential side penetration holes and multiple inner circumferential side penetration holes are formed at four corners of each of the lower springs; the outer circumferential side penetration holes sleeves lug bosses on the pedestals; the inner circumferential side penetration holes are configured to connect and fix with the lower end surfaces of the lens supports; two ends at same sides of each of the lower springs are, provided with two terminal pins; and after assembly, the two terminal pins contact two pins on the PCB boards to form electrical connections.

7. The double-camera drive device as claimed in claim 1, wherein each of the Hall chips and the Hall magnet provided on corresponding lens support is spatially in a relationship of being opposite to each other in positions.

8. The double-camera drive device as claimed in claim 1, wherein the two Hall magnets respectively comprised in the first Hall detection component and the second Hall detection component must be required to keep highly consistent in loading positions; that is, the two Hall magnets on the two lens supports must be completely consistent in the loading positions, and are arranged in a translation relationship.

9. The double-camera drive device as claimed in claim 1, wherein each distance between left driving magnets, middle driving magnets and right driving magnets and the drive coils keeps consistent.

10. The double-camera drive device as claimed in claim 2, wherein the double-camera drive device in an exemplary embodiment comprises further take supporting effect, wherein the pedestals comprises a first pedestal and a second pedestal respectively provided corresponding to the first photographing component and the second photographing component; the first pedestal and the second pedestal are of an integrally molded pedestal structure: two inner cavities that are equal in size are arranged in the integrally molded pedestal structure; the two inner cavities are arranged in parallel; and dustproof rings having a certain height and protruded are respectively arranged along the circumferential sides of the inner cavities and are matched with lower end portions of the lens supports for dustproof effect.

* * * * *